(12) United States Patent
Ogino

(10) Patent No.: US 9,904,278 B2
(45) Date of Patent: Feb. 27, 2018

(54) NUMERICAL CONTROLLER CAPABLE OF PERFORMING AXIS CONTROL ROUTINE OF A PLURALITY OF AXES IN DISTRIBUTED MANNER

(71) Applicant: FANUC Corporation, Minamitsuru-gun, Yamanashi (JP)

(72) Inventor: Hideo Ogino, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 323 days.

(21) Appl. No.: 14/825,394

(22) Filed: Aug. 13, 2015

(65) Prior Publication Data

US 2016/0062348 A1 Mar. 3, 2016

(30) Foreign Application Priority Data

Aug. 29, 2014 (JP) .................................. 2014-175149

(51) Int. Cl.
*G05B 19/18* (2006.01)
*G05B 19/414* (2006.01)

(52) U.S. Cl.
CPC .. *G05B 19/4141* (2013.01); *G05B 2219/2205* (2013.01); *G05B 2219/34015* (2013.01)

(58) Field of Classification Search
CPC .................................................. G05B 19/4141
See application file for complete search history.

(56) References Cited

U.S. PATENT DOCUMENTS

| 4,956,785 | A | 9/1990 | Kawamura et al. |
| 2008/0243299 | A1* | 10/2008 | Johnson ............... G05B 19/414 700/169 |
| 2010/0088706 | A1* | 4/2010 | Dong .................... G06F 9/4887 718/103 |
| 2010/0174886 | A1* | 7/2010 | Kimelman ............ G06F 9/4818 712/28 |
| 2011/0022822 | A1* | 1/2011 | Chandhoke ........... G06F 9/5066 712/36 |

(Continued)

FOREIGN PATENT DOCUMENTS

| JP | S63-181005 A | 7/1988 |
| JP | H01-161503 A | 6/1989 |

(Continued)

OTHER PUBLICATIONS

Notification of Reasons for Refusal dated Jan. 10, 2017 in Japanese Patent Application No. 2014-175149 (2 pages) with an English Translation (2 pages).

(Continued)

*Primary Examiner* — Vincent Tran
(74) *Attorney, Agent, or Firm* — Drinker Biddle & Reath LLP

(57) ABSTRACT

A numerical controller that controls a machine including a plurality of axes includes a multi-core processor having a plurality of cores. If a request is made to cause each of the plurality of cores to perform a plurality of pieces of grouped axis control routine obtained by dividing axis control routine of the plurality of axes by a unit of any number of the axes, an execution unit arranged in each of the plurality of cores performs the grouped axis control routine. In addition, a completion state of the plurality of pieces of grouped axis control routine is monitored.

3 Claims, 7 Drawing Sheets

(56) References Cited

U.S. PATENT DOCUMENTS

| | | | |
|---|---|---|---|
| 2011/0161965 A1* | 6/2011 | Im | G06F 9/5038 |
| | | | 718/102 |
| 2011/0238955 A1* | 9/2011 | Nickolls | G06F 9/30072 |
| | | | 712/220 |
| 2013/0041510 A1* | 2/2013 | Kurakake | G05B 19/4141 |
| | | | 700/275 |
| 2014/0042950 A1 | 2/2014 | Aoyama et al. | |
| 2015/0277973 A1* | 10/2015 | Xu | G06F 9/4843 |
| | | | 718/107 |

FOREIGN PATENT DOCUMENTS

| | | |
|---|---|---|
| JP | H01-195507 A | 8/1989 |
| JP | H09-6425 A | 1/1997 |
| JP | 2012-139047 A | 7/2012 |
| JP | 2013-054730 A | 3/2013 |
| JP | 2014-035564 A | 2/2014 |

OTHER PUBLICATIONS

Notification of Reasons for Refusal dated Aug. 2, 2016 in Japanese Patent Application No. 2014-175149 (2 pages) with an English Translation (2 pages).

Decision to Grant a Patent dated Aug. 8, 2017 in Japanese Patent Application No. 2014-175149 (3 pages) with an English translation (3 pages).

* cited by examiner

NUMERICAL CONTROLLER CAPABLE OF PERFORMING AXIS CONTROL ROUTINE OF A PLURALITY OF AXES IN DISTRIBUTED MANNER

RELATED APPLICATION DATA

This application claims priority under 35 U.S.C. § 119 and/or § 365 to Japanese Application No. 2014-175149 filed Aug. 29, 2014, the entire contents is incorporated herein by reference.

BACKGROUND OF THE INVENTION

1. Field of the Invention

The present invention relates to a numerical controller, and in particular, relates to a numerical controller having a multi-core processor and capable of improving performance by causing a plurality of cores of the multi-core processor to perform axis control routine in a distributed manner.

2. Description of the Related Art

Processing of control software of a numerical controller that controls machine tools includes processing of high real-time properties as typified by various kinds of interpolation routine and axis control routine to create distribution data to each control axis and processing of low real-time properties as typified by automatic operation routine that analyzes a machining program or creates interpolation preparation data and HMI (human-machine interface) routine that performs an operation in accordance with the screen display or an operation.

The axis control routine having high real-time properties needs to be completed within a specified period and thus, if the time of the axis control routine increases with an increasing number of control axes, it becomes difficult to allocate the processing time within the specified period to other automatic operation routine or HMI routine having low real-time properties. When, for example, a machining program instructed in mold machining and formed of microsegment lines is operated at high speed, it is necessary to analyze the machining program and to create interpolation preparation data in large quantities in a short time, but automatic operation routine or HMI routine is not adequately performed in situations in which the time of axis control routine increases and therefore, problems of unreachability of the command speed, an irregular machined surface due to an interrupted distribution pulse, a slower update of the screen display and a slower response to an operation arise.

For the purpose of smoothly analyzing a machining program and creating interpolation preparation data, JP 63-181005 A and JP 1-195507 A propose a technology that divides the analyzing of a machining program and creation of interpolation preparation data into a plurality of processes and allocates each of the divided processes to each CPU of a multi-CPU for processing.

Also, for the purpose of reducing the costs, JP 2014-35564 A discloses a technology that provides a numerical controller having a multi-core processor, wherein a numerical control processor and a sequence control processor, provided separately in the past, are integrated as one of multi-cores of one processor, respectively, and also enables integration of peripheral control LSI by connecting the processor and the peripheral control LSI by a high-speed serial bus to reduce the number of pins of the LSI.

The amount of processing by control software of a numerical controller increases year by year due to adoption of multi-axial or multi-path machine tools or realization of high-functionality desires and particularly, an increase of axis control routine due to multi-axial machine tools is remarkable. In addition, further shortening of the specified period of axis control routine having high real-time properties is required to realize high-precision machining at high speed and, as a result, it is necessary to perform more pieces of processing in a shorter time.

In the hardware configuration of multi-CPU described in JP 63-181005 A and JP 1-195507 A mentioned above, the cost rises with an increasing number of CPU and further, peripheral hardware circuits on which the multi-CPU is mounted becomes more complicated, thereby increasing man-hours needed for design and maintenance. Such prior art techniques reduce the processing time of the analyzing of a machining program and the creation of interpolation preparation data, but do not directly control the increase of axis control routine due to the adoption of multi-axial machine tools and are not sufficient as measures in response to requirements in recent years and further, the processing can be made faster by adopting CPU of a higher operating frequency, but problems of heat generation and increased power consumption arise, which makes the CPU unfit as a processor used to control a machine tool used in an unfavorable environment such as a manufacturing site.

In the case of a numerical controller having a multi-core processor described in JP 2014-35564 A, on the other hand, heat generation and power consumption are reduced to a low level while the costs are decreased, but the increase of axis control routine due to the adoption of multi-axial machine tools is not directly controlled and thus, like the technologies described in JP 63-181005 A and JP 1-195507 A, the technology is not sufficient as measures in response to requirements in recent years.

SUMMARY OF THE INVENTION

An object of the present invention is to provide a numerical controller that uses a multi-core processor that reduces heat generation and power consumption to a low level with a relatively low operating frequency and is at lower cost than a multi-CPU configuration and includes means for dividing axis control routine into groups of any number of axes and causes a plurality of cores of the multi-core processor to perform the processing in a distributed manner.

A numerical controller according to the present invention includes a multi-core processor having a plurality of cores, controls a machine including a plurality of axes, and is adapted to complete axis control routine configured by individual-axis routine which is processed for each of the plurality of axes and common routine which is processed commonly among the axes within a time of a specified period. The numerical controller further includes: an execution start request unit that requests each of the plurality of cores to perform a plurality of pieces of grouped axis control routine obtained by dividing the axis control routine of the plurality of axes by a unit of any number of the axes; a grouped axis control routine execution unit which is arranged in each of the plurality of cores to perform the grouped axis control routine in response to a request from the execution start request unit; and an execution completion monitoring unit which monitors a completion state of the plurality of pieces of grouped axis control routine by the grouped axis control routine execution unit.

The numerical controller may be configured to use an inter-core interrupt when the execution start request unit makes a request to cause each of the plurality of cores to perform the plurality of pieces of grouped axis control routine in a distributed manner.

The grouped axis control routine execution unit may be configured to write the completion state of the grouped axis control routine into an inter-core shared memory, and the execution completion monitoring unit may be configured to monitor the inter-core shared memory.

According to the present invention, by including the above configuration, axis control routine having high real-time properties can be performed in a short time by using a multi-core processor even when a machine tool having a large number of control axes is controlled and further, plenty of allocation time can be secured for processing of low real-time properties such as automatic operation routine and HMI routine. Thus, the overall performance of the numerical controller can be enhanced at relatively low costs while heat generation and power consumption are reduced to a low level and therefore, multi-axial or multi-path machine tools can be adopted and also requests of higher performance can be met.

Further, even if the number of control axes increases in the future, the increase of the number of control axes can easily be dealt with by distributing axis control routine for increased axes using a multi-core processor having more cores.

BRIEF DESCRIPTION OF THE DRAWINGS

The above-described and the objects and the features of the present invention will become apparent from the following description of the embodiment by reference to the accompanying drawings.

DETAILED DESCRIPTION OF THE PREFERRED EMBODIMENTS

Figure 1:
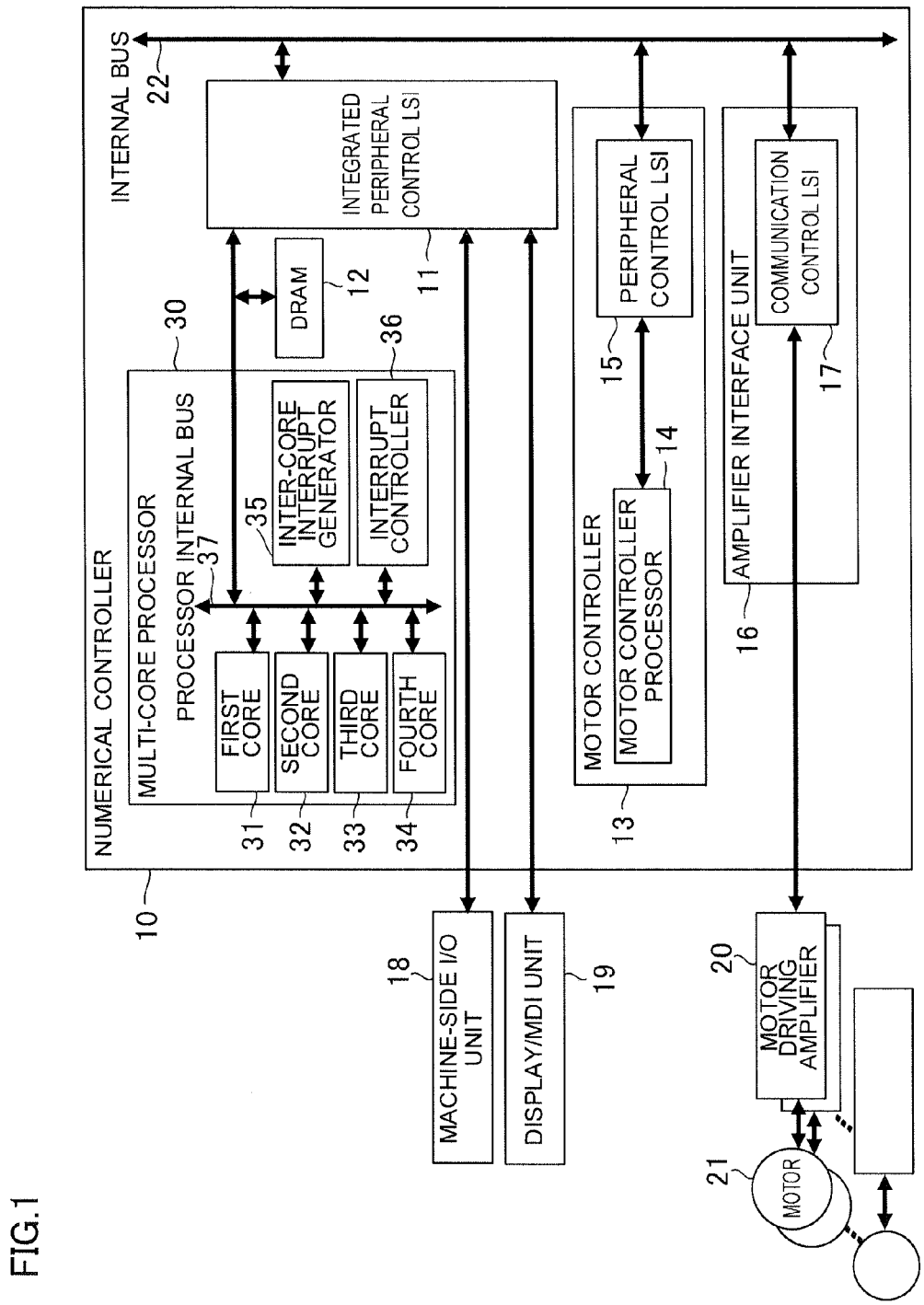
FIG. 1 is a block diagram illustrating principal units of an embodiment of a numerical controller according to the present embodiment.

FIG. 1 is a block diagram illustrating principal units of an embodiment of a numerical controller according to the present embodiment.

A numerical controller 10 includes a multi-core processor 30, an integrated peripheral control LSI 11, a motor controller 13 including a motor controller processor 14 and a peripheral control LSI 15 thereof, and an amplifier interface unit 16 that performs communication with a motor driving amplifier 20 and these elements are respectively connected by an internal bus 22.

The multi-core processor 30 includes four cores, a first core 31 to a fourth core 34, an inter-core interrupt generator 35 that generates, among interrupts, particularly interrupts between CPU cores, and an interrupt controller 36 that generates an interrupt to communicate state changes from various devices and the like and these elements are connected by a processor internal bus 37. The multi-core processor 30 further includes an inter-core shared memory used for inter-core communication to share information among the cores 31 to 34. For example, a DRAM 12 is used as the inter-core shared memory.

The multi-core processor 30 performs analytical processing of a machining program to control the motor driving amplifier 20 connected to the numerical controller 10, creates a movement command by performing movement command creation routine based on a result of the analytical processing, and sends the created movement command to a RAM (not shown) inside the peripheral control LSI 15 of the motor controller 13 via the integrated peripheral control LSI 11 and the internal bus 22.

The motor controller processor 14 of the motor controller 13 reads the movement command written into the internal RAM to create motor control data that is sent to the motor driving amplifier 20. Then, the motor controller processor 14 sends the created motor control data to a communication control LSI 17 of the amplifier interface unit 16 via the internal bus 22.

The communication control LSI 17 of the amplifier interface unit 16 sends data written into an internal RAM thereof to the motor driving amplifier 20. Then, the motor driving amplifier 20 drives motors 21 corresponding to a plurality of axes included in a machine tool (not shown) to control the machine tool (not shown).

The multi-core processor 30 also performs programmable machine control routine (PMC routine) that executes a predetermined sequence control program based on input data from the machine tool (not shown) connected to the numerical controller 10 or the like. Then, the multi-core processor 30 sends a signal to control each machine element to a machine-side I/O unit 18 based on the result of the PMC routine.

An display/MDI unit 19 is a manual data input apparatus including a display, a keyboard and the like. The integrated peripheral control LSI 11 receives a command or data from the keyboard and delivers the command or data to the multi-core processor 30 and also outputs a display command output by display processing performed by the multi-core processor 30 to a display of the display/MDI unit 19.

Figure 2:
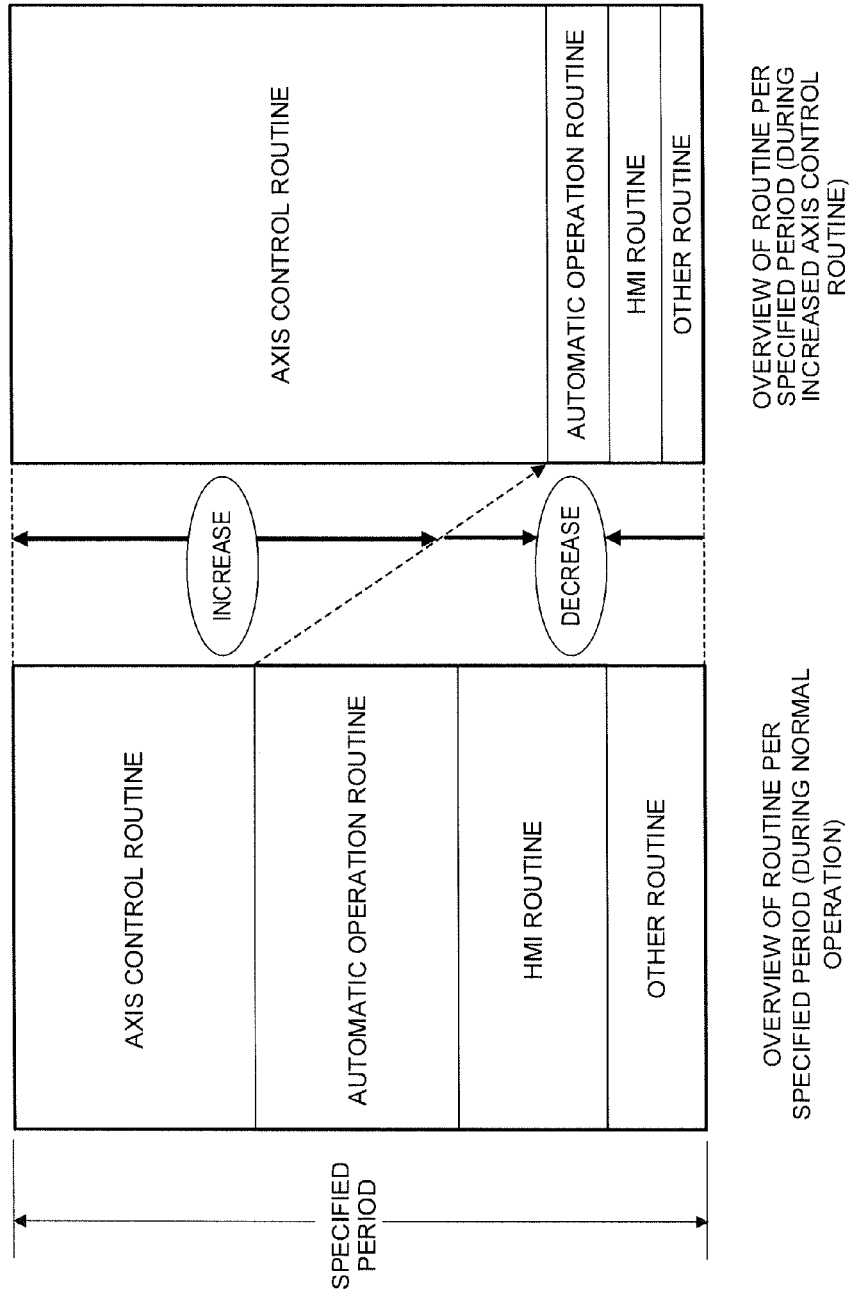
FIG. 2 is a diagram showing an overview of processing performed per specified period during normal operation and during increased axis control routine, by a conventional numerical controller, realized by one CPU without using a multi-core processor.

FIG. 2 is a diagram showing an overview of processing performed per specified period during normal operation and during increased axis control routine by a conventional numerical controller realized by one CPU without using a multi-core processor.

"Axis control routine" shown in FIG. 2 is processing of high real-time properties such as various kinds of interpolation routine and distribution pulse creation routine to each control axis, and processing for the number of axes to be controlled needs to be necessarily completed within the specified period.

On the other hand, "Automatic operation routine" is processing to analyze a machining program created by the user to machine a workpiece by driving a machine tool to issue a command and to create preparation data for interpolation. "HMI routine" is processing to make a screen display or to perform an operation in accordance with an operation. The "automatic operation routine" and "HMI routine" are processing of low real-time properties that does not need to be necessarily completed within the specified period and processing remaining without being completed continues to be performed in the next period.

In a numerical controller that controls machine tools having a small number of control axes, for example, a machine tool configured by three basic axes of the X axis, the Y axis, and the Z axis, as shown on the left side (during normal operation) of FIG. 2, the ratio of the axis control routine within the specified period is relatively small and thus, plenty of time can be allocated to the automatic operation routine and the HMI routine.

On the other hand, multi-axial machine tools having a plurality of rotation axes to control the posture of a table or a tool and multi-axial machine tools having the aforementioned three basic axes and a plurality of rotation axes for simultaneous processing by placing a plurality of workpieces are also available. In a numerical controller that controls such machine tools having a large number of control axes, as shown on the right side ("during increased axis control routine") of FIG. 2, the ratio of the axis control routine within the specified period is relatively large and it is difficult to allocate plenty of time to the automatic operation routine or the HMI routine.

When such circumstances arise, if, for example, a machining program such as a mold machining program in which the block length is short and the processing speed is fast is operated, analyzing of the machining program or creation of preparation data for interpolation is not completed in time and thus, disadvantages such as an irregular machined surface, a slower update of the screen display and a slower response to an operation occur.

Axis control routine of a numerical controller includes 'common routine' which is performed commonly without depending on each control axis and 'individual-axis routine' which is performed individually for each control axis.

Figure 3:
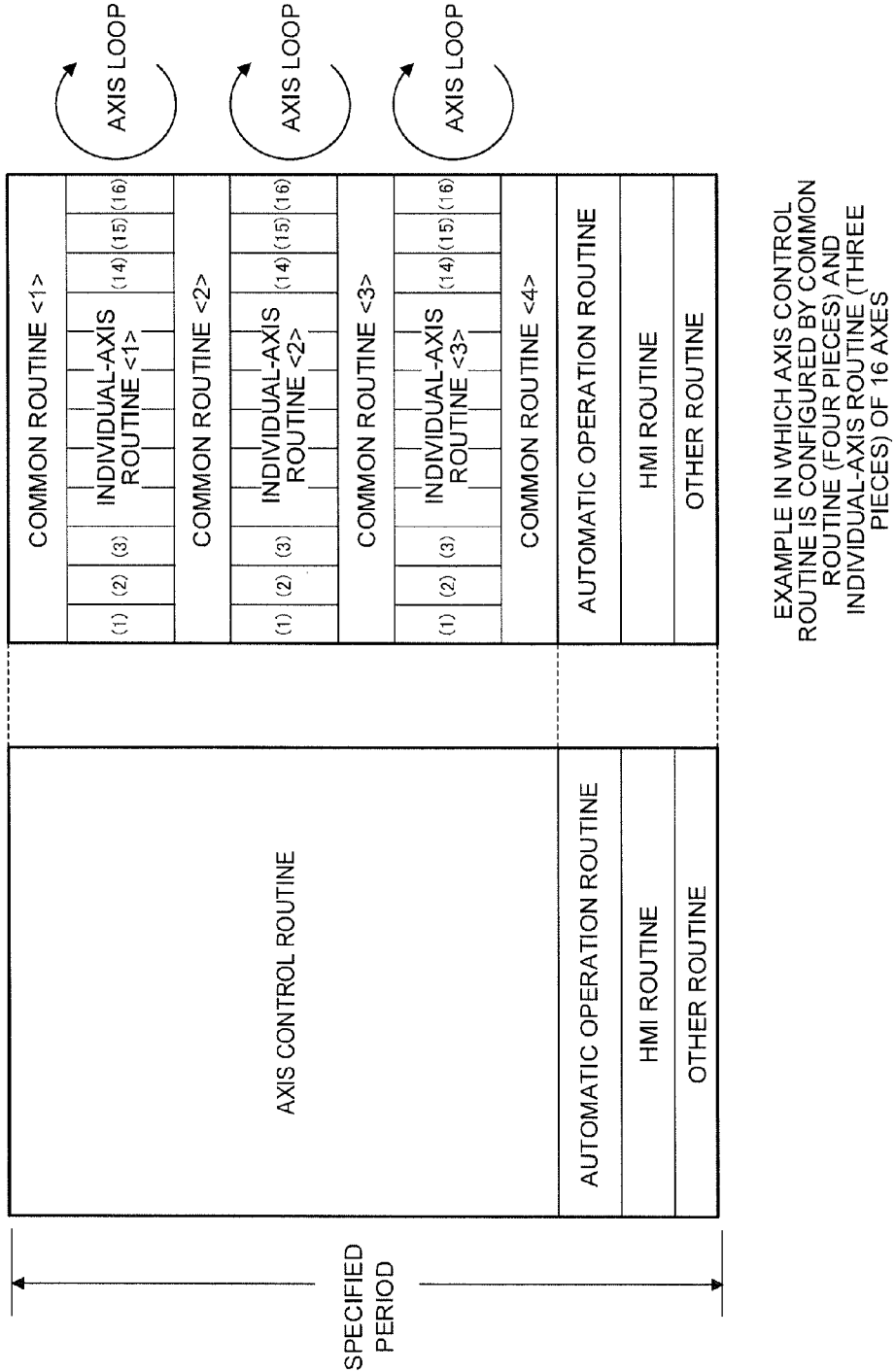
FIG. 3 is a diagram showing an example of the processing performed per specified period during increased axis control routine shown in FIG. 2 in which the axis control routine is configured by four pieces of 'common routine' and three pieces of 'individual-axis routine'.

FIG. 3 is a diagram showing an example of the processing performed per specified period during increased axis control routine shown in FIG. 2 in which the axis control routine is configured by four pieces of 'common routine' and three pieces of 'individual-axis routine'. In the 'individual-axis routine', repeated processing is performed in an axis loop from the first axis to the 16-th axis in order. Note that "(N)" in FIG. 3 (and FIG. 4) represents the N-th axis (N=1, 2, . . . , 16).

Figure 4:
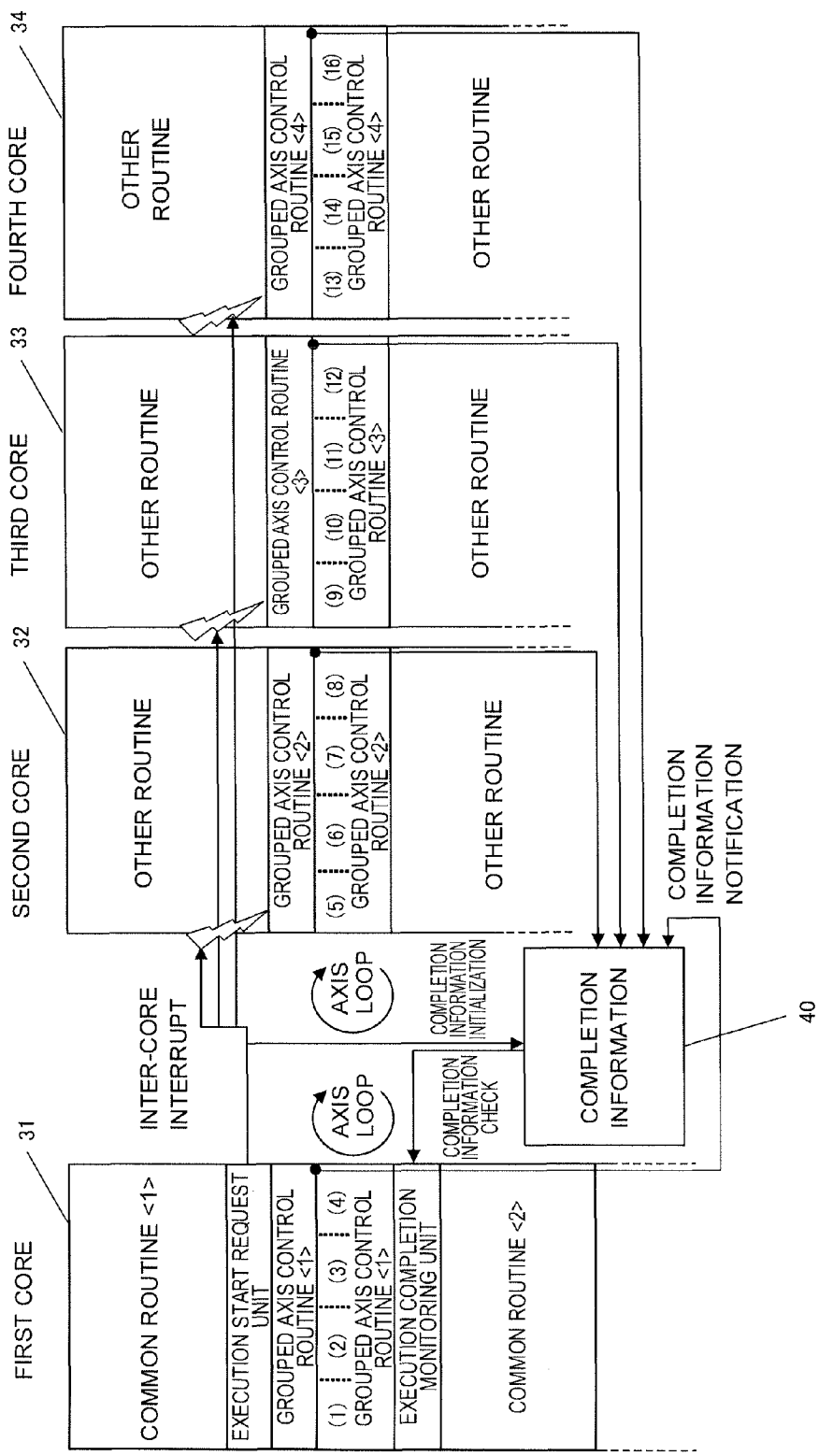
FIG. 4 is a diagram showing an example of distribution example of the axis control routine using the multi-core processor having four cores for 'individual-axis routine <1>' shown in FIG. 3.

FIG. 4 is a diagram showing a distribution example of the axis control routine using the multi-core processor having four cores for 'individual-axis routine <1>' shown in FIG. 3.

In the distribution example of the axis control routine in FIG. 4, 'common routine <1>' and 'common routine <2>' are performed by the first core, and the individual-axis routine <1> for 16 axes to be performed in the meantime is performed by four cores in a distributed manner; grouped axis control routine <1> for four axes of the first axis to the fourth axis by the first core, grouped axis control routine <2> for four axes of the fifth axis to the eighth axis by the second core, grouped axis control routine <3> for four axes of the ninth axis to the twelfth axis by the third core, and grouped axis control routine <4> for four axes of the thirteenth axis to the sixteenth axis by the fourth core.

In the first core, after 'common routine <1>' is performed, processing by an execution start request unit is performed. Completion information indicating the completion of grouped axis control routine divided into four groups is arranged in an inter-core shared memory 40 for four groups, which corresponds to the divided number. In this processing, these four pieces of completion information is first initialized. Subsequently, for the second, third, and fourth cores, an inter-core interrupt is caused via the inter-core interrupt generator 35, and the processing start by grouped axis control routine execution units <2>, <3>, <4>, allocated to each of these cores, is requested. Then, processing by a grouped axis control routine execution unit <1> allocated to the first core, is started.

In the second, third, and fourth cores, with the generation of the above inter-core interrupt, processing by the grouped axis control routine execution units <2>, <3>, <4> associated with the interrupt is activated and performed for each core.

In the processing by the grouped axis control routine execution units <1>, <2>, <3>, <4>, the grouped axis control routine <1>, <2>, <3>, <4> allocated to each core is repeatedly performed as many times as the number of allocated axes (in the present embodiment, four axes for all cores). When the processing for the number of axes allocated to each core is all completed, the completion information arranged in the inter-core shared memory is informed of the completion of the grouped axis control routine allocated to the relevant cores by the grouped axis control routine execution units <1>, <2>, <3>, <4>.

On the other hand, when the grouped axis control routine <1> is completed in the first core and the completion information is notified, processing by an execution completion monitoring unit is performed. Here, the present processing is completed by confirming the completion information of grouped axis control routine for all four cores, which indicates that all cores are in a completion state, then the processing proceeds to execution by a common routine unit <2>.

Figure 5:
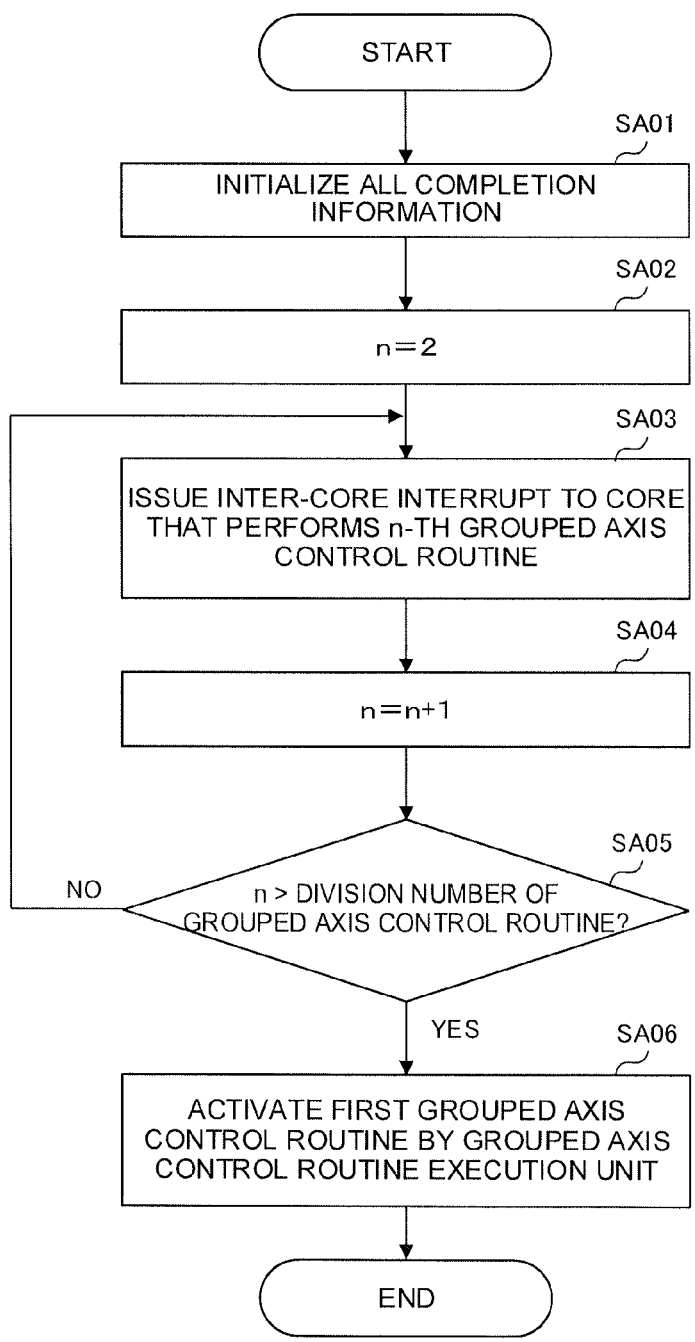
FIG. 5 is a flow chart showing the flow of execution start request routine performed by any one of cores of the multi-core processor in the numerical controller in FIG. 1.

FIG. 5 is a flowchart showing the flow of execution start request routine performed by the execution start request unit. The execution start request routine is performed in one of the cores (in the first core, in the case of the present embodiment) of the multi-core processor to allocate the grouped axis control routine to each core and to make a start request of the grouped axis control routine.

[Step SA01] All completion information arranged in the inter-core shared memory is initialized.

[Step SA02] '2' is allocated to a variable n (division number counter of the grouped axis control routine).

[Step SA03] An inter-core interrupt is issued, via the inter-core interrupt generator 35, to the core that performs the n-th grouped axis control routine.

[Step SA04] The value of the variable n is incremented by 1.

[Step SA05] It is determined whether or not the value of the variable n is larger than the division number of the grouped axis control routine. If the variable n is larger than the division number of the grouped axis control routine, the process proceeds to Step SA06, but if the variable n is not larger than the division number, the process returns to Step SA03.

[Step SA06] The first grouped axis control routine is activated by the grouped axis control routine execution unit that functions in the own core.

Figure 6:
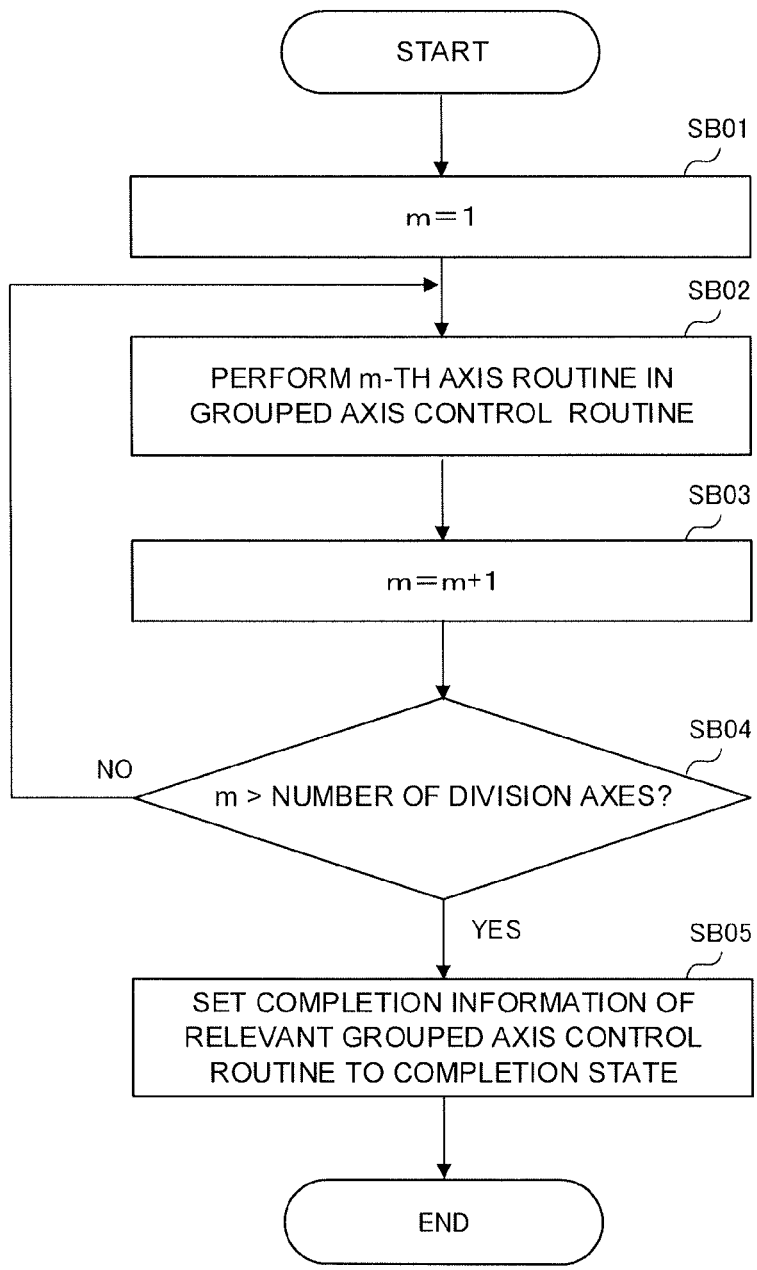
FIG. 6 is a flow chart showing the flow of grouped axis control routine allocated to a own core performed by any one of cores of the multi-core processor in the numerical controller in FIG. 1.

FIG. 6 is a flow chart showing the grouped axis control routine performed by the grouped axis control routine execution unit. The grouped axis control routine is performed in each core and the grouped axis control routine allocated to the own core is sequentially performed.

[Step SB01] '1' is allocated a variable m (counter of the number of division axes).

[Step SB02] The m-th axis routine is performed in the grouped axis control routine.

[Step SB03] The value of the variable m is incremented by 1.

[Step SB04] It is determined whether or not the value of the variable m is larger than the number of division axes allocated to the own core. If the variable m is larger than the number of division axes allocated to the own core, the process proceeds to Step SB05, but if the variable m is not larger than the number of division axes, the process returns to Step SB02.

[Step SB05] The completion information indicating the completion of the grouped axis control routine allocated to the own core is set to a completion state.

Figure 7:
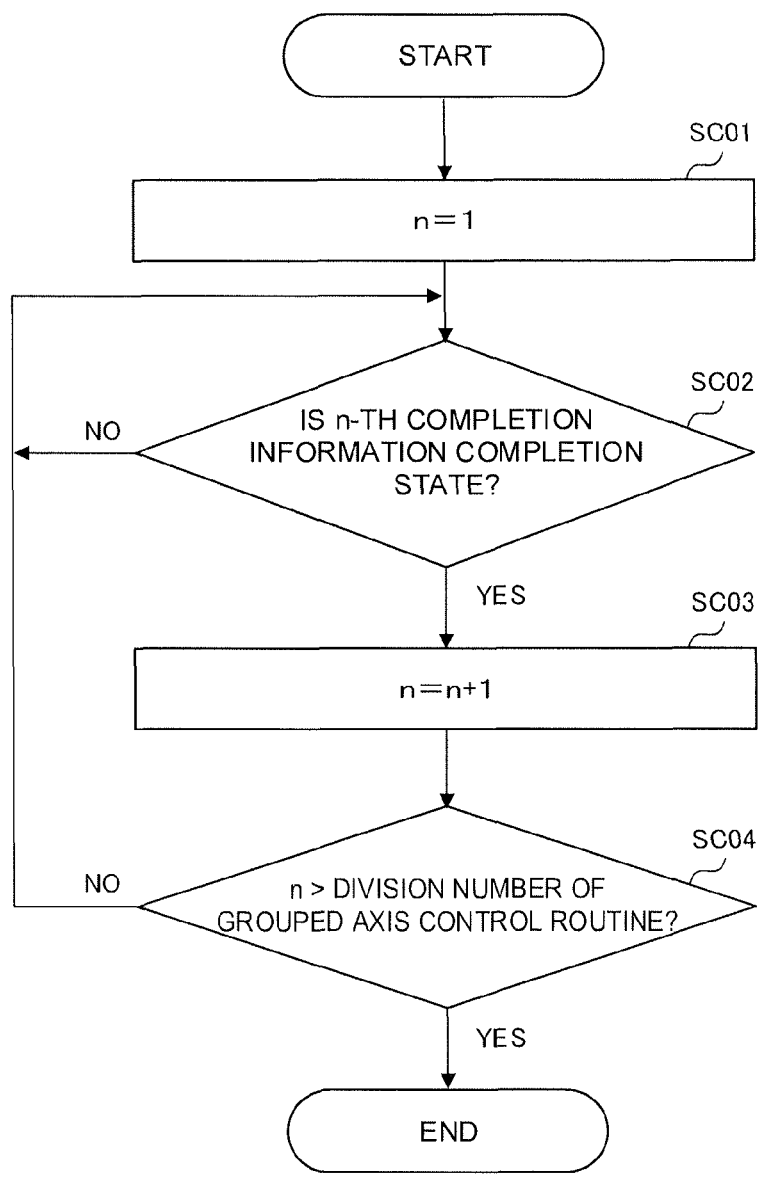
FIG. 7 is a flow chart showing the flow of execution completion monitoring routine to wait for the completion of the grouped axis control routine performed by any one of cores of the multi-core processor in the numerical controller in FIG. 1.

FIG. 7 is a flow chart showing the flow of execution completion monitoring routine performed by the execution completion monitoring unit. The execution completion monitoring routine is performed by one of the cores (in the first core, in the case of the present embodiment) of the multi-core processor to wait for the completion of the grouped axis control routine allocated to each core.

[Step SC01] '1' is allocated to the variable n (division number counter of the grouped axis control routine).

[Step SC02] It is determined whether or not the n-th completion information is in a completion state. If the n-th completion information is in a completion state, process proceeds to Step SC03, but if the n-th completion information is not a completion state, processing in Step SC02 is repeated.

[Step SC03] The value of the variable n is incremented by 1.

[Step SC04] It is determined whether or not the value of the variable n is larger than the division number of the grouped axis control routine. If the variable n is larger than the division number of the grouped axis control routine, this processing is terminated, but if the variable n is not larger than the division number, process returns to Step SC02.

In general, axes that control machine tools include axes of various uses such as a servo axis that controls the position and posture of a table on which machined work is placed and tools and a spindle axis (main axis) that controls the turn of a workpiece to be machined and the rotation of tools, and the axis control routine in the examples of the above embodiments can be applied to the axis control of axes of such various uses.

In the foregoing, embodiments of the present invention have been described, but the present invention is not limited to the examples of the above embodiments and can be embodied in other forms by making appropriate modifications.

If, for example, incomplete execution of one piece of grouped axis control routine or more is detected by the execution completion monitoring unit, the execution completion monitoring unit may be caused to perform non-real-time routine at a lower level for a fixed time before returning to execution completion monitoring again. In addition, the number of axes to be processed in the grouped axis control routine allocated to each core does not have to be necessarily fixed and the number of axes to be allocated to each core may be made settable and changeable in accordance with the axis configuration or core capabilities, for example, allocating three axes to the first core and four axes to each of the second to fourth cores for 15-axis configuration.

The invention claimed is:

1. A numerical controller which includes a multi-core processor having a plurality of cores, for controlling a machine including a plurality of axes, the numerical controller comprising:
   an execution start request unit that allocates, to each of the plurality of cores to perform, a plurality of pieces of a grouped axis control routine obtained by dividing an axis control routine of the plurality of axes by a unit of any number of the axes, wherein the plurality of pieces of the grouped axis control routine allocated to each of the cores is based on one or both of (i) an axis configuration of the machine and (ii) a capability of the respective core;
   a grouped axis control routine execution unit which is arranged in each of the plurality of cores to perform the plurality of pieces of the grouped axis control routine allocated to each of the cores; and
   an execution completion monitoring unit which monitors a completion state of the plurality of pieces of the grouped axis control routine allocated to each of the cores.

2. The numerical controller according to claim 1, wherein the numerical controller is configured to generate an inter-core interrupt to cause each of the plurality of cores to perform the allocated plurality of pieces of the grouped axis control routine in a distributed manner.

3. The numerical controller according to claim 1, wherein the grouped axis control routine execution unit arranged in each of the plurality of cores is configured to write the completion state of the plurality of the pieces of the grouped axis control routine allocated to the respective core into an inter-core shared memory, and
   the execution completion monitoring unit is configured to monitor the inter-core shared memory.

* * * * *